United States Patent [19]

Carpenter et al.

[11] 4,341,496

[45] Jul. 27, 1982

[54] SEAT PALLET LOCK

[75] Inventors: Gary J. Carpenter; Gábor L. Radi, both of Jamestown, N. Dak.

[73] Assignee: Western Gear Corporation, Lynwood, Calif.

[21] Appl. No.: 96,656

[22] Filed: Nov. 23, 1979

[51] Int. Cl.³ .......................... B60P 1/64; B60P 7/06; B63B 25/24
[52] U.S. Cl. ................................ 410/79; 244/137 R; 410/69; 410/77
[58] Field of Search .................... 244/137; 410/77, 78, 410/79, 80, 81, 82, 83, 84, 85, 86, 92, 46, 69

[56] References Cited

U.S. PATENT DOCUMENTS

| | | | |
|---|---|---|---|
| 3,288,411 | 11/1966 | Davidson | 410/79 |
| 3,381,921 | 5/1968 | McDonough et al. | 244/137 X |
| 3,486,204 | 12/1969 | Hurtner et al. | 410/77 |
| 4,234,278 | 11/1980 | Harshman et al. | 410/77 X |

Primary Examiner—Joseph F. Peters, Jr.
Assistant Examiner—Howard Beltran

[57] ABSTRACT

A seat pallet lock and more particularly an improved seat pallet lock for utilization with aircraft passenger seat pallets to retain such pallets in the operational position on the aircraft.

10 Claims, 10 Drawing Figures

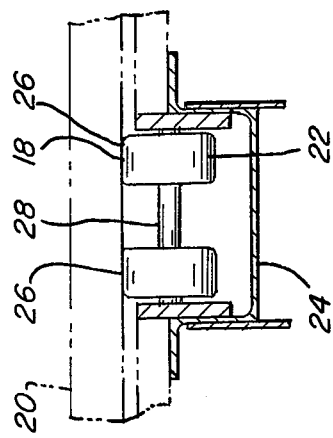
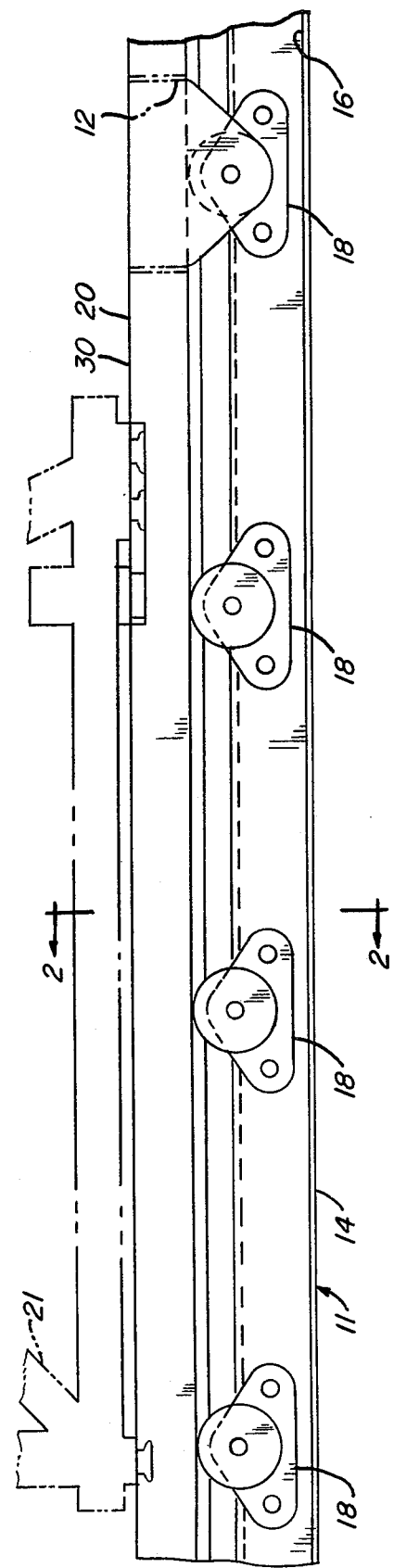

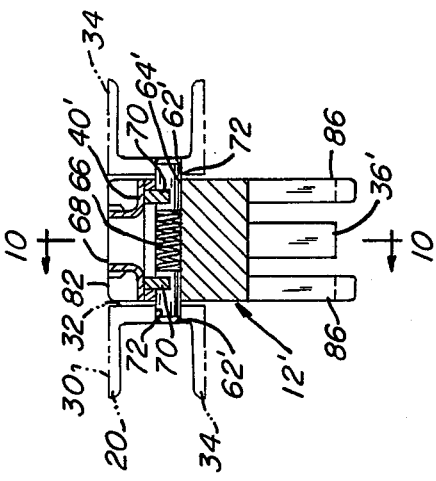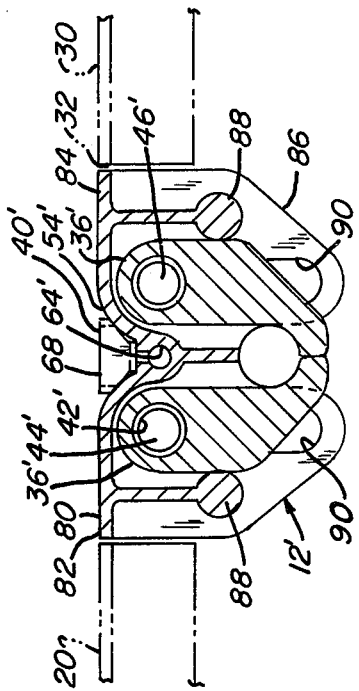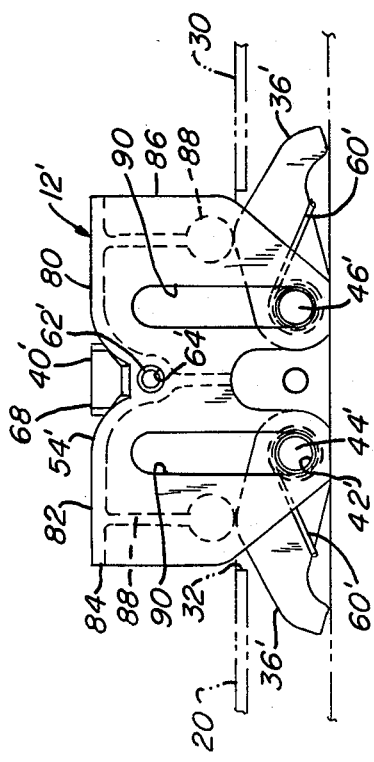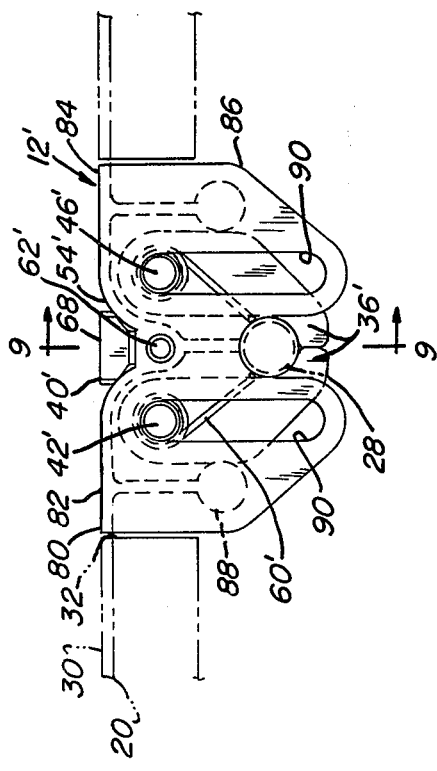

SEAT PALLET LOCK

In the modern aircraft carrier industry fiscal and operational considerations dictate that in many instances the airliner's aircraft be able to be selectively utilized as both cargo and passenger carriers or as a combination thereof. In this regard, it is essential that in such instances suitable means be provided for the safe and efficient conversion of aircraft from cargo to passenger configuration.

A primary system utilized heretofore to provide for passenger and cargo conversions is through the use of a passenger seat pallet and cargo pallet system. In such systems, the pallets roll into and out of position over a plurality of rollers which are positioned within formed channels in the aircraft floor. Securing arrangements are provided to secure the pallets into operational position. The structures utilized heretofore for securing the cargo pallets into operational position have generally been found to be acceptable; however, the prior securing arrangements for the passenger seat pallets have presented a number of deficiencies, for example: overly complex; required special seat tracks in the aircraft floor which were independent from the roller tray; required tools or were cumbersome insofar as the positioning and release of the seat pallets; and/or may have portions thereof which projected above the passenger floor and thus presented obstructions insofar as under seat storage or free space.

By means of the present invention which includes seat pallet locks carried by the seat pallet and which are cooperable with rollers within the roller tray to provide restraint of the aircraft passenger seat pallets in the forward, aft, vertical and side directions, the hereinabove mentioned deficiencies of prior seat pallet retention arrangements are overcome, or in the least greatly alleviated.

Accordingly, it is one object of this invention to provide an aircraft carrier passenger seat pallet lock structure which does not require special seat tracks.

A further object of this invention is to provide such a seat pallet lock structure which may be readily engaged and disengaged manually and without the necessity of tools.

A still further object of this invention is to provide such a seat pallet lock structure which, when in the engaged position thereof, is flush with the passenger floor and has no portions thereof protruding upwardly therefrom.

These and other objects and advantages of the present invention will become more readily apparent upon a reading of the following description and drawings in which:

FIG. 1 is a longitudinal view, partially schematic, of a portion of a roller tray supporting an aircraft passenger seat pallet thereon and which schematically illustrates a seat pallet lock of the present invention;

FIG. 2 is a cross sectional view taken on lines 2—2 of FIG. 1 and which illustrates a roller assembly of the type which the seat pallet lock of the present invention is cooperable with;

FIG. 7 is a front elevational view of another embodiment of an aircraft carrier seat pallet lock of the present invention and which illustrates such a seat pallet lock in the disengaged position thereof;

FIG. 8 is a front elevational view of the seat pallet lock of FIG. 7 in the engaged position thereof;

FIG. 9 is a cross sectional view taken on lines 9—9 of FIG. 8; and

FIG. 10 is a cross sectional view taken on lines 10—10 of FIG. 9.

Figure 4:
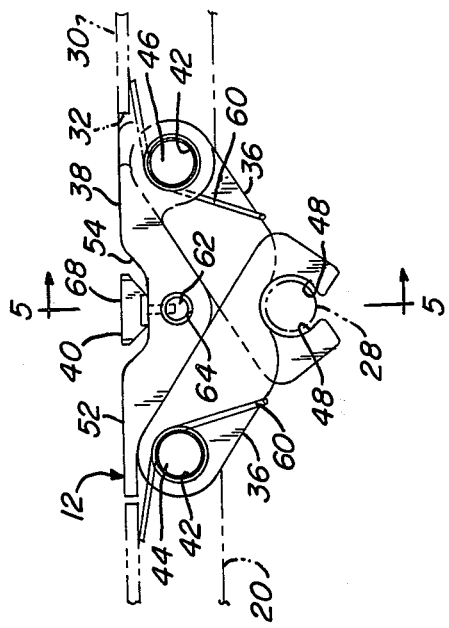
FIG. 4 is a front elevational view of the seat pallet lock of FIG. 3 in the engaged position thereof.

Referring to FIG. 1 there is illustrated a portion of an aircraft passenger seat pallet and cargo pallet system 10 which incorporates therein the aircraft carrier seat pallet locks 12 of the present invention. As is known, such systems generally include a plurality of roller channels, such as channels 14, which are formed within or at the aircraft floor 16 and which extends longitudinally with respect to the axis of elongation of the aircraft (not shown). The channels 14 include a plurality of longitudinally spaced roller assemblies 18 therein which provide a relatively frictionless path for the entry and removal of the cargo pallets (not shown) and the seat pallets 20 to and from the aircraft.

The seat pallets 20 are of a configuration generally well known in the art and are generally rectangular in shape and adapted to carry a plurality, for example 6 seats 21 thereon. The width of the seat pallets 20 is variable in accordance with the width of the aircraft. A width of pallets 20 of 60 inches to 80 inches is common to thus provide a single row of longitudinally adjacent pallets 20 along the entire length of the aircraft. In instances of utilization of a system 10 in wide body aircraft it may be necessary to provide two longitudinally extending rows of seat pallets 20.

As is illustrated in FIG. 2, roller assemblies 18 each comprise a roller 22 which is suitably rotatably supported within a channel portion 24. The axis of rotation of rollers 22 extends horizontally transversely with respect to the longitudinal extent of the aircraft and each roller 22 comprises axially spaced coaxially aligned portions 26 which engage the passenger seat pallets 20 for the rolling movement thereof therealong. A reduced diameter shaft or pin portion 28 of the roller 22 extends coaxially between portions 26. As will be described hereinafter, the seat pallet locks 12 of the present invention are selectively cooperable with adjacent ones of such pin portions 28 for the positional retention of the seat pallets 20. In this latter regard it is to be noted that a plurality of additional channels 14 (not shown) are normally provided within the aircraft floor 16; however, in such other channels 14, the rollers therefor are of a uniform diameter rather than the varying diameter of rollers 22 for inasmuch as the pallet locks 12 will be locatable only on those channels 14 containing the rollers 22, the other channels 14 may carry uniform diameter rollers therewithin.

The configuration and general operation of the system 10 and the elements discussed hereinabove, other than the aircraft seat pallet locks 12 and the cooperation thereof with the roller assemblies 18, are generally well known in the art. Accordingly, there is no necessity to further describe system 10 and such elements for a full understanding of the invention herein by one skilled in the art and, as such, a further description will not be set forth hereinafter except where necessary to amplify the description of seat pallet locks 12 and the cooperation thereof with roller assemblies 18.

For purposes of description hereinafter references to: longitudinally shall be with respect to the direction of elongation of the aircraft and channels 14; transversely shall be in a direction horizontally transversely of the longitudinal direction; and upper and lower or upwardly and downwardly shall be with reference to the passenger seat floor 30 of the aircraft as is viewed in FIGS. 3 through 10.

FIGS. 3 thru 6 illustrate a first embodiment of an aircraft seat pallet lock 12 constructed in accordance with the principles of the present invention. In practice, suitable openings 32 will be formed within the seat pallets 20 for the receipt of the seat pallet locks 12 therewithin. As shown, such openings 32 are positioned intermediate oppositely toeing transversely spaced longitudinally extending seat pallet framing channels 34. In a contemplated usage of the seat pallet locks 12 within a system 11, a pallet lock 12 will be located in each corner vicinity of the forward and aft ends of the seat pallet 20. The specific location of locks 12 will be such that they will be aligned with respective channels 14 for selective engagement with the shaft portion 28 of adjacent roller assemblies 18 for the retention of the seat pallet 20 within the operational position thereof.

Figure 5:
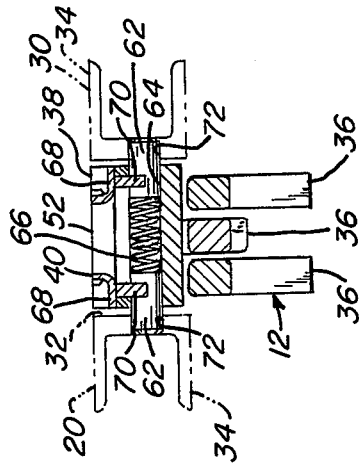
FIG. 5 is a cross sectional view taken on lines 5—5 of FIG. 4.
Figure 3:
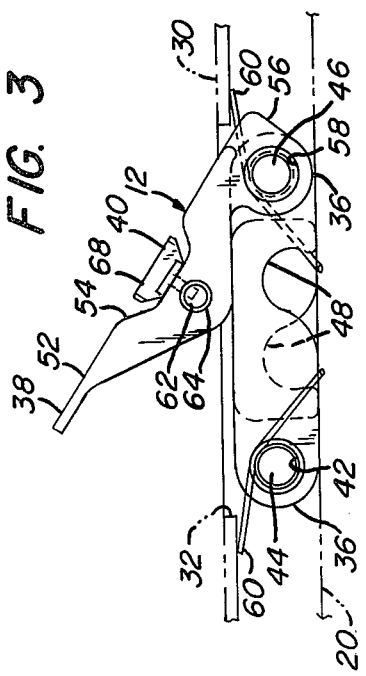
FIG. 3 is a front elevational view of one embodiment of an aircraft passenger seat pallet lock of the present invention and illustrated in the disengaged position thereof.

Each aircraft passenger seat pallet lock 12 comprises: a plurality of lock arms 36 which are pivotly carried by channels 34 and are operable to selectively engage and disengage shaft portion 26 of the roller assembly 18 for the captive retention thereof; a lock actuating and cover member 38 which is pivotly carried by channels 34 and is selectively operable to mechanically actuate lock arms 36 in a cam-like fashion into the engaged positions thereof; and a spring biased retaining means 40 which is carried by the actuating member 38 and is operable to cooperate therewith and with adjacent channels 34 to retain the seat pallet lock 12 in the engaged position thereof as is illustrated in FIGS. 4 and 5 and to be selectively manually releasable to allow the seat pallet lock 12 to resume the disengaged position thereof as is illustrated in FIG. 3.

As is illustrated in FIG. 3 thru 6, the seat pallet lock 12 includes three lock arms 36 each of which comprise: a bore 42 therethrough adjacent one end thereof for the receipt of a pivot pin 44 or 46 therethrough; and a downwardly open formed retaining opening 48 adjacent the opposite or free end thereof. The lock arms 36 and the actuating member 38 are carried by respective ones of the longitudinally spaced transversely extending pivot pins 44 and 46. The pivot pins 44 and 46 have the respective axial end portions thereof received within suitably aligned bores 50 which extend through the web portions of transversely spaced framing channels 34. Pivot pins 44 and 46 are retained in the operational positions thereof in any suitable manner; for example, by press fitting or cotter pins.

Figure 6:
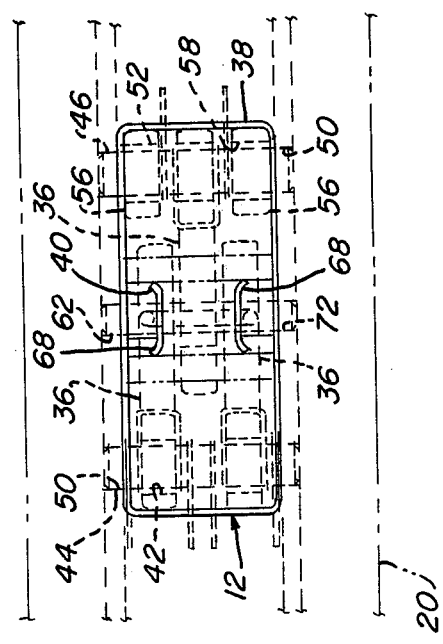
FIG. 6 is a plan view of the seat pallet lock in the position illustrated in FIG. 4.

As is shown, pivot pin 44 pivotly carries a transversely spaced pair of lock arms 36 and the other pivot pin 46 pivotly carries the other lock arm 36 at an intermediate location as well as the actuating member 38 at axial end portions thereof. As is best illustrated in FIG. 6, the transverse spacing between the lock arms 36 which are carried by the pivot pin 44 is such that the lock arm 36 which is carried by pivot pin 46 is freely received transversely between the other two lock arms 36 in a sandwich-like fashion.

The lock actuating and cover member 38 has a generally planar upper surface 52 thereof which is substantially dimensionally equivalent to the opening 32 therefor and which lies in a common plane within passenger floor 30 when the seat pallet lock 12 is in the engaged position thereof as is illustrated in FIG. 4. A generally transversely extending upwardly open groove 54 is formed within surface 52 for the receipt of portions of the retaining means 40 therewithin. One transversely extending side portion of actuating member 38 includes a transversely spaced downwardly extending pair of lug portions 56 which include coaxially aligned bores 58 therein for the receipt of the pivot pin 46 therethrough. The lock arm 36 which is additionally carried by pivot pin 46 is located transversely intermediate lug portions 56.

Suitable biasing means, such as torsion springs 60 which are carried by pivot pins 44 and 46, are provided to normally bias lock arms 36 and lock actuating and cover member 38 into the upper disengaged position thereof as is illustrated in FIG. 3. The lower portion of actuating member 38 is formed in a generally inverted triangular configuration such that upon the downward pivoting thereof to overcome the bias of the torsion spring 60 carried by the pivot pin 46, the downwardly facing sloping surfaces thereof engage the upper longitudinal surfaces of adjacent lock arms 36. Thus, the lock arms are urged to pivot downwardly about the respective pivot axes thereof to captively retain the shaft portion 28 of the adjacent roller 22 in a manner as is illustrated in FIG. 4. The retaining means 40 is operative to retain the lock arms 36 in the FIG. 4 engaged position thereof when the upper surface 52 of member 38 is coplanar with the aircraft passenger floor 30.

Retaining means 40 comprise a pair of transversely spaced locking pins 62 which are received within a bore 64 which extends transversely through member 38 at a location below the groove 54. A compression spring 66 is disposed within bore 64 axially intermediate the spaced locking pins 62 to normally bias the springs 62 away from each other. An axially extending intermediate portion of bore 64 is open to groove 54. A transversely spaced pair of lock pin actuators 68 are positioned within groove 54 which each include a downwardly extending portion 70 to provide a rigid connection between the actuators 68 and the respective locking pins 62 which they control.

With a structure as described above, to engage the seat lock pallet 12 the lock pin actuators 68 are grasped by two fingers and squeezed thus collapsing the compression spring 66 and drawing locking pins 62 within the bore 64. While continuing to squeeze the pin actuators 68, the operator pushes the lock actuating and cover member 38 downwardly until the lock arms 36 and member 38 reach the positions indicated in FIG. 5 and the lock arms 36 captively retain the shaft portion 28 of the roller 22. While continuing to hold the member 38 down, the operator releases his finger pressure on pin actuators 68 thus causing compression spring 66 to expand and lock pins 62 to extend outwardly from respective opposite sides of bore 64. The outwardly extending ends of lock pins 62 are received within coaxially aligned bores 72 which extend transversely through adjacent web portions of the seat pallet framing channels 34. The seat pallet lock 12 is now engaged and provides forward, aft, vertical and side restraint of the seat pallet 20. It is noted that as shown a pair of the lock arms 36 provide restraint of the seat pallet 20 in the forward direction and a single lock arm 36 provides the aft restraint of pallet 20. This arrangement of lock arms 36 is utilized to meet aircraft restraint criteria which normally specifies greater crash resistance in the forward direction than in the aft direction.

To disengage the pallet lock 12 from the engaged position thereof the operator merely squeezes the pin actuators 68 to compress the spring 66 and cause the locking pins 62 to withdraw from bores 72 into the bore 64. The operator then pulls upwardly on the member 38 and this upward force, in conjunction with the bias provided by torsion springs 60, results in the pallet lock 12 assuming the disengaged position illustrated in FIG. 3. The bias of torsion springs 60 will result in the maintenance of the FIG. 3 disengaged position of pallet lock 12 thus providing an unobstructed lower surface of seat pallet 20 to facilitate the entry and removal of the pallets 20 from the aircraft.

FIGS. 7 through 10 illustrate another embodiment of an aircraft seat pallet lock 12' constructed in accordance with the principles of the present invention. Seat pallet lock 12' is quite similar in construction and operation to the seat pallet lock 12 described hereinbefore with the primary distinction therebetween being in the differing configuration and supporting of the lock actuation and cover member 80 of seat pallet lock 12'. It will be appreciated from the description hereinafter that lock actuation and cover member 80 provides a similar function and operation with respect to that of member 38 of pallet lock 12. Accordingly, for purposes of description hereinafter, elements of pallet lock 12' which are identical to like elements of pallet lock 12 will be identified with identical reference numerals and elements of pallet lock 12' which are similar in configuration and operation to like elements of pallet lock 12 will be identified by identical reference numerals primed.

The aircraft passenger seat pallet lock 12' comprises: a pair of lock arms 36' for the selective engagement of an adjacent shaft portion 28 of a roller 22; a lock actuating and cover member 80 which is carried by pins 44' and 46' for vertical movement with respect thereto to mechanically actuate lock arms 36' in a cam-like fashion into the engaged position thereof; and a retaining means 40' carried by member 80 for the retention of seat pallet lock 12' in the engaged position thereof as is illustrated in FIGS. 8, 9 and 10.

The lock actuating and cover member 80 has a generally planar upper surface 82 which lies in a common plane with the passenger floor 30 when the seat pallet lock 12' is in the engaged position thereof as is illustrated in FIG. 8. Cover member 80 comprises: a generally planar top member 84 the dimensions of which approximate the dimensions of opening 32; a transversely spaced pair of side members 86 which extend vertically downwardly from the transverse edges of the top member 84; and a pair of longitudinally spaced web members 88 which extend transversely between the side members 86. Each side member 86 includes a pair of vertically extending slots 90 transversely therethrough. In assembled position, the locking arms 36' are located transversely intermediate the side members 86 and the pivot pins 44' and 46' extend through the respective bores 42' of the locking arms 36' and also through the transversely adjacent slots 90. The length of slots 90 are proportioned such that when the seat pallet lock 12' is in the FIG. 7 disengaged position thereof the pivot pins 44' and 46' engage the lowermost end of the respective slots 90 therefor and when pallet lock 12' is in the FIG. 8 engaged position thereof, the upper surface 82 thereof is coplanar with the aircraft passenger floor 30 and the pivot pins 44' and 46' engage the uppermost end of the respective slots 90 therefor.

In the disengaged position of seat pallet lock 12', the lowermost end of web members 88 engage an upwardly facing surface of the lock arms 36'. The torsion springs 60' thus provide the requisite bias to retain lock arms 36' in the disengaged position thereof and also to maintain the actuation member 80 in the FIG. 7 disengaged position therefor thereby providing an unobstructed lower surface of the seat pallets 20.

The engagement and disengagement of seat pallet locks 12' is quite similar to that of seat pallet 12 discussed hereinbefore with the primary distinction therebetween being that the actuation member 80 is vertically moveable rather than pivotal. Thus, to engage the pallet locks 12', the pin actuators 68 are squeezed to withdraw the locking pins 62' and the actuation member 80 is pushed downwardly. During the downward movement of member 80, the web members 88 engage the adjacent surfaces of lock arms 36' in a cam-like fashion to cause the lock arms 36' to pivot about the pivot axes therefor into the engaged position thereof. In the engaged position of pallet lock 12', as illustrated in FIGS. 8 through 10, the web members 88 prevent the locking arms 36' from pivoting back to the disengaged position thereof. To disengage the pallet lock 12', a similar procedure is followed except the member 80 is pulled upwardly rather than pushed downwardly.

The invention herein is to a structure for aircraft pallet seat locks of the type to be utilized in a system 10 without the necessity for separate seat pallet lock tracks and also which may be readily manually engaged and disengaged without the necessity of tools and further which will not encroach on the clear space of the passenger floor area. Accordingly, various modifications may be made by those skilled in the art to the preferred embodiments described hereinabove without departing from the scope of the invention which is defined by the claims set forth hereinafter. For example: alternative retaining means, such as a ratchet arrangement may be provided rather than the retaining means 40; interior type torsion springs may be substituted for the exterior torsion springs 60; and the like.

What is claimed is:

1. A pallet lock adapted to be carried by a pallet and which lock is selectively operable to engage an elongated latch member comprising, a pair of elongated support means adapted to be supported by such a pallet on opposite lateral sides of such a latch member and extending generally parallel thereto;

elongated arm means pivotably supported at one end thereof by said support means, respectively;

biasing means operationally carried by said support means and cooperable with said arm means, respectively, for biasing said arm means to a first position whereat said arm means extend generally laterally of said support means;

said arm means being of a length and having the other ends thereof of a configuration to captively encompass such a latch member upon pivotable movement of said arm means from said first position to a second position;

actuator means movably supported by at least one of said support means in engagement with said arm means, said actuator means being movable to move said arm means into said second position;

and selectively operable retaining means carried by said actuator means and adapted to engage such a pallet to retain said actuator means in engagement with said arm means when said arm means are in said second position.

2. A pallet lock as specified in claim 1 wherein said actuator means is pivotably supported by one of said support means.

3. A pallet lock as specified in claim 1 wherein when said arms are in said second position the outer surface of said actuator means remote from such a latch means is adapted to be essentially flush with an adjacent surface of such a pallet.

4. A pallet lock as specified in claim 1 wherein said actuator means is supported by said support means for vertical movement and said actuator means moves said arms into said second position upon downward movement thereof.

5. A pallet lock as specified in claim 1 wherein said retaining means comprises oppositely outwardly spring biased members essentially selectively retractable within the outer periphery of said actuating means.

6. A pallet lock as specified in claim 1 wherein said supporting means is stationary.

7. A pallet lock as specified in claim 1 wherein said arm members extend towards each other when in said first position.

8. A pallet lock as specified in claim 7 wherein said arm members are in lateral overlapping relationship in said first position.

9. A pallet lock as specified in claim 1 wherein such pallets are rolled into such an aircraft on top of roller assemblies carried by an aircraft and at least certain ones of said roller assemblies have a plurality of such latch members therein.

10. A pallet lock as specified in claim 1 wherein said arm members extend away from each other when in said first position.

* * * * *

UNITED STATES PATENT AND TRADEMARK OFFICE
CERTIFICATE OF CORRECTION

PATENT NO. : 4,341,496

DATED : July 27, 1982

INVENTOR(S) : Gary J. Carpenter et al.

It is certified that error appears in the above-identified patent and that said Letters Patent is hereby corrected as shown below:

Column 7, line 12, "arms" should read -- arm means --.

Column 7, line 19, "arms" should read -- arm means --.

Column 8, line 8, "arm members" should read -- arm means --.

Column 8, line 11, "arm members" should read -- arm means --.

Column 8, line 19, "arm members" should read -- arm means --.

Signed and Sealed this

Sixteenth Day of November 1982

[SEAL]

Attest:

GERALD J. MOSSINGHOFF

Attesting Officer   Commissioner of Patents and Trademarks